US012493867B2

(12) United States Patent
Kim et al.

(10) Patent No.: US 12,493,867 B2
(45) Date of Patent: Dec. 9, 2025

(54) METHOD, SERVER AND USER TERMINAL FOR PROVIDING GIFT CARD

(71) Applicant: KAKAO CORP., Jeju-si (KR)

(72) Inventors: Eun Ha Kim, Seongnam-si (KR); Su Yeon Na, Seongnam-si (KR); Seo Hyung Cho, Seongnam-si (KR); Dong Hwan Kim, Seongnam-si (KR); Hyun Ji Oh, Seongnam-si (KR); Lim Ah Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 141 days.

(21) Appl. No.: 18/149,359

(22) Filed: Jan. 3, 2023

(65) Prior Publication Data
US 2024/0062188 A1  Feb. 22, 2024

(30) Foreign Application Priority Data

Aug. 16, 2022   (KR) .................. 10-2022-0102360

(51) Int. Cl.
*G06Q 20/34*  (2012.01)
*H04L 51/06*  (2022.01)

(52) U.S. Cl.
CPC .......... *G06Q 20/342* (2013.01); *G06Q 20/34* (2013.01); *H04L 51/06* (2013.01)

(58) Field of Classification Search
None
See application file for complete search history.

(56) References Cited

U.S. PATENT DOCUMENTS

| 2015/0106225 A1* | 4/2015 | Glass ..................... G06Q 20/12 705/26.7 |
| 2017/0206711 A1* | 7/2017 | Li ......................... G06V 10/95 |
| 2021/0297374 A1* | 9/2021 | Forster .................. G10L 13/00 |
| 2022/0261881 A1* | 8/2022 | Aslam ................ G06Q 30/0232 |

FOREIGN PATENT DOCUMENTS

| EP | 3101614 A1 * | 12/2016 | ............. G06Q 20/04 |
| JP | 2017199268 A | 11/2017 | |
| JP | 2020013260 | 1/2020 | |
| JP | 2020522826 | 7/2020 | |
| KR | 10-2010-0007063 A | 1/2010 | |
| KR | 10-1681057 B1 | 6/2016 | |

OTHER PUBLICATIONS

Takataka Saito, Office Action, Japanese Application No. 2023-000280, Mar. 14, 2020, 3pages, Japan Patent Office.

* cited by examiner

*Primary Examiner* — Joseph W. King
(74) *Attorney, Agent, or Firm* — NKL LAW; Jae Youn Kim (57) ABSTRACT

Disclosed is a method for displaying a gift card, and the method includes: receiving the gift card and gift information corresponding to the gift card from a server, wherein the gift card is associated with content information corresponding to at least one of a photo type, a video type, and a voice type; displaying a message comprising a first area and a second area separate from each other, wherein the gift information is displayed in the first area and a type of the content information is displayed in the second area; receiving an interaction for viewing the content information; displaying an output layout according to the gift information and the type of the content information; and outputting the content information through the output layout.

13 Claims, 9 Drawing Sheets

METHOD, SERVER AND USER TERMINAL FOR PROVIDING GIFT CARD

STATEMENT DESIGNATING GRACE PERIOD INVENTOR DISCLOSURE

The disclosures of the subject matter of this application were made, one year or less before the effective filing date of this claimed invention, by the inventor or joint inventor or by another who obtained the subject matter disclosed directly or indirectly from the inventor or a joint inventor. The applicant posted the invention in a press release on the Kakao commerce website on Jan. 4, 2022, at website on the world wide web news1.kr/articles/?4543835 and fnnews.com/news/202201040853394916, which fall under grace period exceptions and do not qualify as prior art under 35 USC 102(b)(1)(A).

BACKGROUND OF INVENTION

Field of the Invention

The present disclosure relates to a method and server for providing a gift card, and a method and user terminal for displaying a gift card.

Related Art

Messenger services through smart phones, tablet computers, PCs, and the like are widely used. Some messenger services provide a function of sending a gift to the other party using a messenger in addition to a function of transmitting a message. In addition, the messenger services also provide a function of sending a gift card with a message when sending the gift.

However, in related arts, there was a problem that the gift card is limited to predetermined and limited types and cannot send the message with the sender's heart. As a result, a recipient of the gift is not really interested in the gift card and pays less attention to the contents of the gift card and information associated with the gift card.

Accordingly, there is need for a method for creating a gift card to express a sender's message and heart and encourage a recipient to have interest in the gift card, the contents of the gift card, and content information linked to the gift card to open the gift card.

RELATED DOCUMENT

Related Document (Patent Document 1) Korea Patent No. 10-1681057

SUMMARY

An aspect of the present disclosure provides a method for making a gift card through which a gift sender can a message in various ways.

Another aspect of the present disclosure provides a method for encouraging a recipient to have interest in a gift card, the contents of the gift card, and content information linked to the gift card to open the gift card.

According to one embodiment, there is provided a method for displaying a gift card by a user terminal, the method including: receiving the gift card and gift information corresponding to the gift card from a server, wherein the gift card is associated with content information corresponding to at least one of a photo type, a video type, and a voice type; displaying a message comprising a first area and a second area separate from each other, wherein the gift information is displayed in the first area and a type of the content information is displayed in the second area; receiving an interaction for viewing the content information; displaying an output layout according to the gift information and the type of the content information; and outputting the content information through the output layout.

In a case where the content information contains a photo, in the displaying of the message, the message may further include a third area in which at least a part of the photo contained in the content information is displayed.

In a case where the content information contains a video, the message may further include a third area in which at least a part of a still image at a specific point in time of the video contained in the content information is displayed.

The third area may be displayed so that a part of the third area is hidden by the second area.

In the displaying the message, at least a part of the content information may be displayed in the message differently according to whether the content information is provided to the server by the other party or whether the content information is information selected by the other party from among information stored in the server.

In a case where the gift card is associated with two different types of content information, one type selected by a predetermined method from among the two different types may be displayed in the second area.

The predetermined method may be to select one of the two different types according to whether the content information is information provided by the other party to the server or whether the content information is information selected by the other party from among information stored in the server.

In a case where the gift card is associated with two different types of content information, two different output layouts may be displayed at predetermined positions according to the type of content information.

The output layout may be a video player when the content information contains a video, and the output layout may be an audio player when the content information contains a voice.

The method may further include: receiving an interaction for saving the output content information as an image; and storing the output content information as an image.

In another aspect, there is provided a user terminal for displaying a gift card, the user terminal including: a memory; and a processor connected to the memory and configured to execute instructions stored in the memory, and the processor is further configured to: receive the gift card and gift information corresponding to the gift card from a server, wherein the gift card is associated with content information corresponding to at least one of a photo type, a video type, and a voice type; display a message comprising a first area and a second area separated from each other in a chat room, wherein the gift information is displayed in the first area and a type of the content information is displayed in the second area; receive an interaction for viewing the content information; display an output layout according to the gift information and the type of the content information; and output the content information through the output layout.

In yet another aspect, there is provided a method for providing a gift card by a server, the method including: receiving information associated with a gift card and gift information corresponding to the gift card from a first user terminal, wherein the gift card is associated with the content information corresponding to at least one of a photo type, a video type, and a voice type; providing a message comprising a first area and a second area separated from each other to a second user terminal, wherein the gift information is displayed in the first area and a type of the content information is displayed in the second area; receiving request information for viewing the content information from the second user terminal; and providing the gift information and the content information to the second user terminal.

In a case where the content information contains a photo, the message further may include a third area in which at least a part of the photo contained in the content information is displayed.

In a case where the content information contains a video, the message may further include a third area in which at least a part of a still image at a specific point in time of the video contained in the content information is displayed.

The third area is displayed so that a part of the third area may be hidden by the second area.

In the providing the message, at least a part of the content information may be displayed in the message differently according to whether the content information is information provided to the server by the first user terminal or whether the content information is information selected by the first user terminal from among information stored in the server.

In a case where the gift card is associated with two different types of content information, in the displaying of the message, one type selected by a predetermined method from among the two different types may be displayed in the second area.

The predetermined method may be to select one of the two different types according to whether the content information is information provided to the server by the first user terminal or whether the content information is information selected by the first user terminal from among information stored in the server.

In yet another aspect, there is provided a server for providing a gift card, the server including: a memory; and a processor connected to the memory and configured to execute instructions stored in the memory, and the processor is further configured to: receive information associated with the gift card and gift information corresponding to the gift card from a first user terminal, wherein the gift information is associated with the content information corresponding to at least one of a photo type, a video type, and a voice type; provide a message comprising a first area and a second area separated from each other to a second user terminal, wherein the gift information is displayed in the first area and a type of the content information is displayed in the second area; receive request information for viewing the content information from the second user terminal; and provide the gift information and the content information to the second user terminal.

In the present disclosure, it is possible to provide a method for making a gift card to express a gift sender's message and heart in various ways.

In addition, in the present disclosure, it is possible to provide a method for encouraging a gift recipient to have interest in a gift card, the contents of the gift card, and content information associated with the gift card to open the gift card.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," and the like, may be used to describe various components, such components are not limited by the above terms. The above terms are used only to distinguish one component from another.

The singular forms are intended to include the plural forms as well, unless the context clearly indicates otherwise.

In this specification, each step described can be performed regardless of a listed order, except for a case where it must be performed in the listed order due to a special causal relationship.

In this application, the term "comprise" or "have" is intended to designate characteristic, numbers, steps, operations, elements, components, or combinations thereof, but it is not intended to preclude the presence or addition of one or more other features, numbers, steps, operations, elements, components, or combinations.

Hereinafter, the present disclosure will be described with reference to the accompanying drawings.

Figure 1:
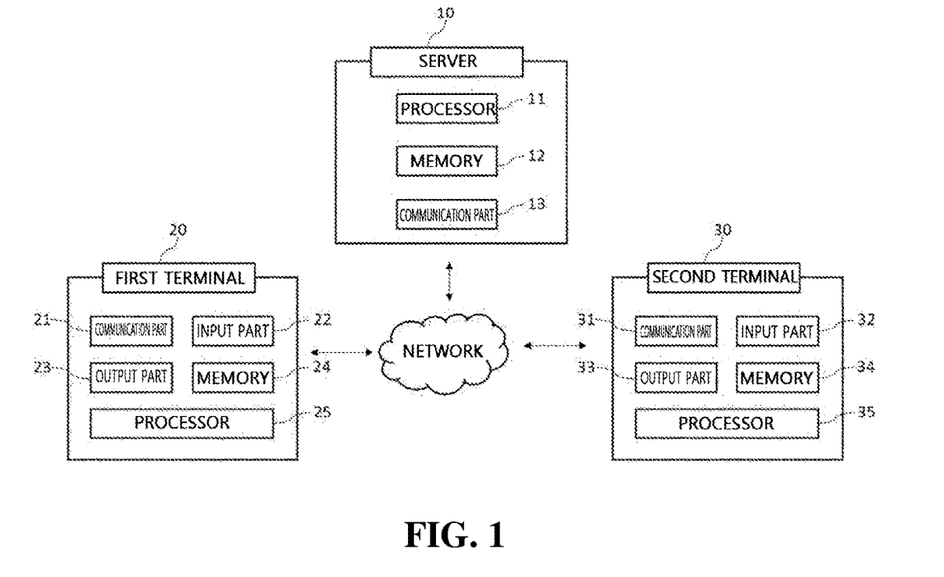
FIG. 1 is a diagram showing an example of a network environment of the present disclosure.

FIG. 1 is a diagram illustrating an example of a network environment according to an embodiment of the present disclosure.

A network environment according to an embodiment of the present disclosure shown in FIG. 1 may include a server 10, a first user terminal 20, and a second user terminal 30.

A network is not limited in communication method, and may include not only a communication method of utilizing a communication network (e.g., mobile communication network, wired Internet, wireless Internet, and broadcasting network) that the network can include, but also short-distance wireless communication.

The server 10 may provide a messenger service to a user terminal. The user terminal described with examples of the first user terminal 20 and the second user terminal 30 is a device using the messenger service provided by the server 10. The server 10 and the user terminal may transmit or receiving a signal or data with each other through a network to perform at least one operation related to creation, participation, exit, and message transmission of a chat room.

In this specification, providing information to a specific user by the server 10 includes providing information on the specific user's account registered for a service provided by the server 10, as well as providing information to a user terminal used by the specific user. However, the above-described two forms of providing information may not be clearly distinguished.

In addition, the server 10 may provide a service for providing, delivering, or mediating a gift between users to a user terminal. The service of providing, delivering, or mediating a gift may be performed based on the above-described messenger service. If the first user sends a gift to the second user, the server 10 may receive a gift provision request from the first user to send a gift to the second user, and may provide gift information corresponding to the request to the second user.

This gift or gift information may be implemented as information transmitted via the network. For example, a gift may be a voucher that can be exchanged for a certain good or service. In this case, the server 10 may provide information on the voucher to the second user terminal 30. Here, the information on the voucher may include at least one of unique identification information of the voucher, a barcode, a QR code, information and contents of exchangeable goods or services, a usage or cancellation period, and the like.

In another example, a gift may be a delivery coupon for receiving a certain good. In this case, the server 10 may provide information on the delivery coupon to the second user terminal 30. Here, the information on the delivery coupon may include information and contents of goods that can be delivered, a use or cancellation period, address information to receive a delivery, and the like. In some cases, the second user terminal 30 may directly input or change address information to receive a delivery. Gift or gift information is not limited to the above description.

The server 10 may be implemented as a computer device or a plurality of computer devices that provide commands, codes, files, contents, services, and the like. The server 10 may be a server 10 capable of transmitting and receiving information through communication with a user terminal via a network.

The server 10 may include a processor 11, a memory 12, and a communication part 13.

The processor 11 may provide a messenger service to a user terminal by controlling overall operations of the memory 12 and the communication part 13. The messenger service may be a service that allows a plurality of users to transmit or receive messages with each other through a platform provided by the server 10. Here, a message may be understood as including all transmittable data such as texts, photos, videos, voice files, and emoticons.

The memory 12 serves as a storage medium and may store a plurality of application programs running in the server 10, and data and instructions for operating the server 10. In one example, the memory 12 may store applications associated with the above-described messenger service and a service for providing, delivering, or mediating a gift.

This memory 12 may be provided in the form of various hardware storage devices such as an ROM, an RAM, a flash drive, a hard drive, and the like, or may be provided in the form of web storage.

The communication part 13 may communicate with a user terminal via a network by wire or wirelessly.

The server 10 of the present disclosure may receive gift information and information associated with a gift card from the first user terminal 20, the gift information being associated with content information corresponding to at least one of a photo type, a video type, a voice type, and a text type, provide a message to the second user terminal 30 in a manner in which the gift information is displayed in a first area and a type of content information is displayed in a second area, receive request information for viewing the content information from the second user terminal 30, and provide the gift information and the content information to the second user terminal 30.

Here, the server 10 may also provide a gift card while providing the gift information to the user terminal. The gift card may correspond to the gift information. If the first user wishes to send a gift to the second user, the gift card may be a message or any of various types of information that the first user wants to send together with the gift to the second user. The gift card may be provided and displayed on the second user terminal together with the gift information.

The gift card may be associated with content information. Content information refers to information linked to a gift card and provided to a recipient of a gift. Specifically, the content information may be attached to the gift card. In addition, the content information may be stored in a separate server, and a connection link connected to the server in which the content information is stored may be attached to the gift card.

The content information may be any of various types of information. The content information may correspond to at least one of a photo type, a video type, a voice type, and a text type, for example. Such content information may be provided to the second user terminal and output (displayed or reproduced) in the second user terminal.

The first user terminal 20 is a terminal device that transmits, to the server 10, a gift provision request for sending a gift to the second user terminal 30. The first user terminal 20 may include a communication part 21, an input part 22, an output part 23, a memory 24, and a processor 25.

The communication part 21 may communicate with the server 10 or other terminals by wire or wirelessly.

The input part 22 may receive any of various types of information through a user's manipulation and input. The input part may include a touch screen module, a keyboard, a mouse, a button, a camera, a stylus, a microphone, and the like.

The first user terminal 20 may receive a user's interaction through the input part 22. An interaction means that the user manipulates the input part 22 to input information with the user's selection or intention reflected therein to the first user terminal 20. For example, the interaction may be a touch on a touch screen, a click of a mouse, typing of a keyboard, sound input of a microphone, image capturing by a camera, motion recognition of a motion sensor, and the like.

The output part 23 may output any of various types of information. The output part 23 may be a display device, a speaker, a vibration generating device, a tactile sensation generating device, and the like. In some cases, the output part 23 may be a device (e.g., Bluetooth earphones) connected to a user terminal through wired or wireless communication (e.g., short-range wireless communication such as Bluetooth) to receive and output a signal.

The memory 24 serves as a storage medium and may store a plurality of application programs running in a user terminal, and data and commands for operating the first user terminal 20. In one example, the memory 12 may store applications associated with the above-described messenger service and a service for providing, delivering, or mediating a gift.

The memory may be provided in the form of any of various hardware storage devices such as an ROM, an RAM, a flash drive, a hard drive, and the like, or may be provided in the form of web storage.

The processor 25 may control overall operations of the communication part 21, the input part 22, the output part 23, and the memory 24 to execute an application associated with a messenger service.

The first user terminal 20 of the present disclosure may transmit, to the server, gift information and information associated with a gift card to be sent to the second user terminal 30. Here, the information associated with the gift card may be content information. The first user terminal 20 may transmit the content information as the information associated with a gift card. The content information that the first user terminal 20 transmits to the server 10 may correspond to at least one of a photo type, a video type, a voice type, and a text type.

However, in some cases, the first user terminal 20 may select at least one of information stored in the server 10, rather than directly transmitting the content information to the server 10. In this case, the information associated with the gift card may be information on selection of the first user terminal 20. That is, the first user terminal 20 selects one of photos, images, or videos previously stored in the server 10 as content information.

The server 10 and the second user terminal 30 may use different methods for displaying content information according to whether the content information is provided directly by the first user terminal 20 to the server 10 or whether the content information is selected by the first user terminal 20 from among information stored in the server 10.

The second user terminal 30 is a terminal device that receives gift information and a gift card from the server 10. The second user terminal 30 may include a communication part 31, an input part 32, an output part 33, a memory 34, and a processor 35.

Each element included in the second user terminal 30 performs substantially the same function as a corresponding element included in the first user terminal 20.

The second user terminal 30 of the present disclosure may receive gift information and a gift card from the server 10, display a message including first and second areas separated from each other in a chat room (in which the gift information is displayed in the first area and information on a type of content information is displayed in the second area), receive an interaction for viewing the content information, display an output layout according to the gift information and the type of the content information, and output the content information through the output layout.

Here, the output layout may be software used to output any of various types of information in the second user terminal 30. In some cases, the output layout may be embedded software that is inserted into and operated by other software. For example, in the present disclosure, when the content information includes a video, the output layout may be a video player, and when the content information includes a voice, the output layout may be an audio player.

Figure 2:
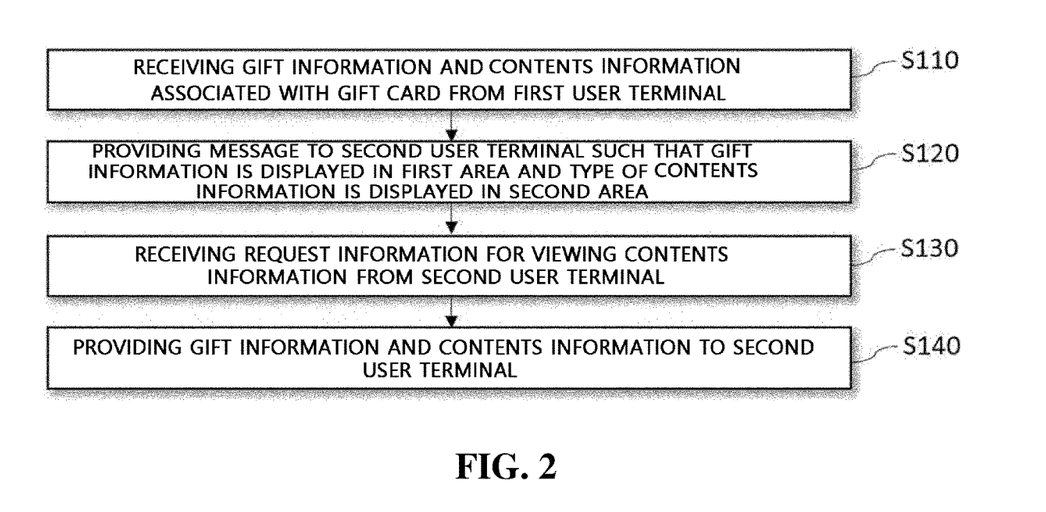
FIG. 2 is a flowchart illustrating a method for providing a gift card according to an embodiment of the present disclosure.

FIG. 2 is a flowchart illustrating a method for providing a gift card by a server 10 according to an embodiment of the present disclosure.

In operation S110, the server 10 receives gift information and gift card-associated information from the first user terminal 20. The gift card is associated with content information corresponding to at least one of a photo type, a video type, a voice type, and a text type.

Here, the information associated with the gift card may be content information. In this case, the server 10 may directly receive the content information from a first user terminal 20. In this case, the content information may be information such as a photo, a video, a voice, or a text stored by the first user terminal 20, or information such as a photo, a video, a voice, or a text newly created by the first user terminal 20.

In some cases, the server 10 may not directly receive the content information from the first user terminal 20, but may receive at least one of information stored in the server 10 selected by the first user terminal 20. In this case, the information associated with the gift card may be information on selection of the first user terminal 20. That is, the first user terminal 20 selects one of photos, images, or videos previously stored in the server 10 as content information. As will be described later, the server 10 may use different methods for displaying content information according to whether the content information is directly received directly from the first user terminal 20 or whether the content information is information selected by the user terminal 20 from among information stored in the server 10.

In operation S120, the server 10 provides the second user terminal 30 with a message including a first area and a second area separated from each other. Specifically, the gift information may be displayed in the first area, and a type of the content information may be displayed in the second area.

This message may be displayed in a chat room in the second user terminal 30. The chat room in which the message is to be displayed may be a chat room in which a first user and a second user are participating. For example, a chat room in which a message is displayed may be a one-to-one chat room between a first user and a second user, or may be a group chat room in which both the first user and the second user are participating (users other than the first and second users are also participating).

If the content information includes a photo or a video, the message may further include a third area in which at least a part of the content information is displayed in operation S120. Specifically, when the content information is a photo, at least a part of the photo may be displayed in the third area of the message. Also, when the content information is a video, at least a part of a still image at a specific point in time of the video may be displayed in the third area of the message.

Each of the first, second, and third areas may be divided so as to be displayed at a predetermined position. Also, each of the first, second, and third areas may be displayed in a predetermined form.

For example, the second area may be displayed as an envelope, and the third area may be displayed as a photo inserted in the envelope of the second area. Specifically, the photo in the third area may be displayed so as to be partially hidden by the envelope in the second area.

In operation S120, the method for displaying content information may vary according to nature of the content information. Specifically, the method for displaying content information may vary according to whether the content information is provided to the server 10 by the first user terminal 20 or whether the content information is information selected by the first user terminal 20 from among information stored in the server 10.

For example, when the content information is provided to the server 10 by the first user terminal 20, the content information may be displayed as being inserted in the envelope corresponding to the second area, as described above. Thus, in the second user terminal 30 having received the gift card, it is possible to view the content information in a new window (screen) by receiving an interaction for viewing the content information.

However, for example, when the content information is information stored in the server by the first user terminal 20, the content information may be displayed as an exposed image rather than an image inserted in a separate envelope. I In this case, since the content information is not contained in an envelope and is not partially hidden, it may not actively induce viewing of content information in a new window (screen), compared to in the case where the content information is contained in an envelope and partially hidden.

In some cases, a gift card may be associated with two different types of content information. For example, one gift card may be associated with both photo-type content information and voice-type content information. In this case, in operation S120, only content information of one type selected by a predetermined method from among two different types may be displayed in the second area.

Here, the predetermined method may be variously determined. For example, one predetermined type may be displayed according to different types of content information. Specifically, which type to display may be set according to a combination of types of content information. For example, if the two different types are a photo type and a voice type, it may be preset to display the photo type. In addition, priorities to display types of content information may be preset. For example, the priorities may be set in the order of a video type, a photo type, a voice type, and a text type. In this case, when two different types are the video type and the text type, the video type having a higher priority may be displayed.

In another example, a different type selected to be displayed may be determined according to whether the content information is provided to the server 10 by the first user terminal 20 or whether the content information is information selected by the first user terminal 20 from among information stored in the server 10. Specifically, among the above two cases of content information, the type of content information provided to the server 10 by the first user terminal 20 may be selected and displayed. Specifically, for example, two different types are a photo type and a voice type. Photo-type information is information selected by the first user terminal 20 from among information stored in the server 10, and voice-type information is information provided by the first user terminal 20 directly to the server 10. In this case, the voice-type information may be displayed.

In operation S130, the server 10 receives request information for viewing the content information from the second user terminal 30. When providing the message in operation S120, the server 10 may provide the message with an interface for requesting to view the content information. In response to receiving an interaction to the interface for requesting to view the content information from the second user terminal 30, the server 10 receives request information for viewing the content information from the second user terminal 30.

In operation S140, the server 10 provides gift information and content information to the second user terminal 30. Here, the server 10 may provide the gift information and the content information through a window other than a chat room where the message is provided in operation S120.

Specifically, content information may be provided through an output layout according to a type of the content information. The output layout may be software used to output any of various types of information in the second user terminal 30. In some cases, the output layout may be embedded software that is inserted into and operated by other software. For example, in the present disclosure, when the content information includes a video, the output layout may be a video player, and when the content information includes an audio, the output layout may be an audio player.

Each of the gift information and the output layout may be displayed at a predetermined position on a screen of the second user terminal 30 according to the type of the content information. Specifically, each of the gift information and the output layout may be displayed in a different form depending on which type of content information the gift card is associated with.

For example, when a gift card is associated with photo-type content information, a photo may be output through a photo output layout in a preset first area, and a lower area of the first area is designated as a second area to output the gift information. However, for example, when the gift card is associated with two items of content information, a photo type and a voice type, a third area may be provided between the first area and the second area, and a voice may be output through an audio output layout in the third area. A form in which content information is displayed in the second user terminal 30 according to a type of the content information and the number of items of the content information may be preset for each type.

Figure 3:
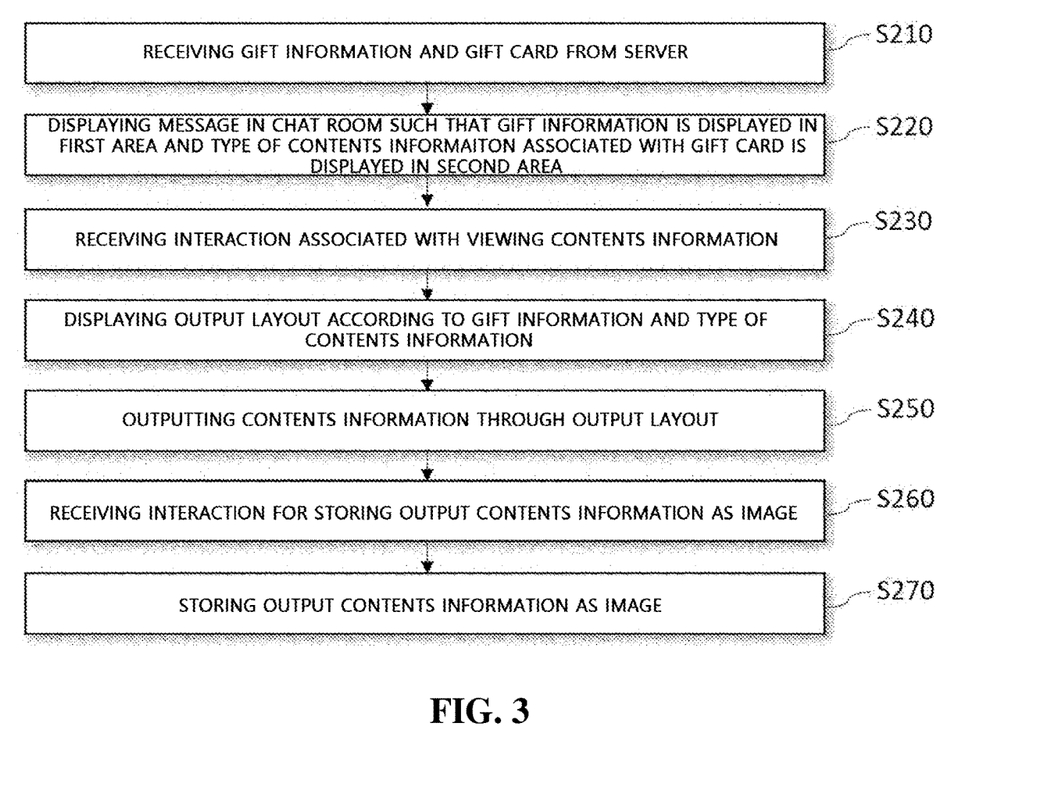
FIG. 3 is a flowchart illustrating a method for displaying a gift card according to an embodiment of the present disclosure.

FIG. 3 is a flowchart illustrating a method for displaying a gift card by a second user terminal 30 according to an embodiment of the present disclosure.

The gift card displaying method of the second user terminal 30 described with reference to FIG. 3 may correspond to the gift card providing method of the server 10 described above with reference to FIG. 2. Therefore, for convenience of explanation, a detailed description of some redundant contents with that of the gift card providing method of the second user terminal 30 described with reference to FIG. 3 will be omitted.

In operation S210, the second user terminal 30 receives gift information and a gift card from the server 10. The gift card is associated with content information corresponding to at least one of a photo type, a video type, a voice type, and a text type.

In operation S220, the second user terminal 30 displays a message in which the gift information and a type of the content information are displayed in the chat room. Operation S220 is an operation corresponding to operation S120 described above with reference to FIG. 2.

The message includes a first area in which gift information is to be displayed, and a second area in which the type of the content information is to be displayed. The chat room, in which the message is to be displayed, may be a chat room in which a first user and a second user are participating.

If the content information includes a photo or video, at least a part of the content information may be displayed in a third area of the message in operation S120. To this end, the second user terminal 30 may generate some information to be displayed in the third area based on the content information. Specifically, when the content information is a photo, at least a part of the photo may be extracted to generate separate information to be displayed in the third area. In addition, when the content information is a video, a still image at a specific point in time of the video may be extracted to generate separate information to be displayed in the third area.

The first, second, and third areas may be divided to be displayed at predetermined positions. Also, the first, second, and third areas may be displayed in predetermined forms.

As described in operation S120 of FIG. 2, a method for displaying content information may vary depending on nature of the content information. Specifically, the method for displaying content information may vary according to whether the content information is information provided by the first user 20 to the server 10 or whether the content information is information selected by the first user terminal 20 from among information stored in the server 10.

In some cases, a gift card may be associated with two different types of content information. For example, one gift card may be associated with both photo-type content information and audio-type content information. In this case, as described in operation S120 of FIG. 2, only one type selected by a predetermined method from among two different types may be displayed in the second area.

In operation S230, the second user terminal 30 receives an interaction for viewing the content information. Operation S230 is an operation corresponding to operation S130 described above with reference to FIG. 2.

The message displayed in operation S220 may be displayed as including an interface for requesting to view the content information. A second user may input an interaction to this interface to view the content information.

In operation S240, the second user terminal 30 displays an output layout according to the gift information and the type of the content information. Operation S240 corresponds to a part of operation S140 described above with reference to FIG. 2. Specifically, operation S240 may be performed prior to operation S140.

In operation S240, the gift information and the output layout may provide gift information and content information through a window rather than the chat room described in operation S120.

The output layout may be software used to output any of various types of information in the second user terminal 30. For example, in the present disclosure, the output layout may be a video player when the content information includes a video, and the output layout may be an audio player when the content information includes a voice.

In operation S250, the second user terminal 30 outputs the content information through the output layout. Operation S250 corresponds to a part of operation S140 described above with reference to FIG. 2. Operations S240 and S250 may be performed sequentially or may be performed substantially concurrently. Thus, in some cases, operation S240 and operation S250 may be perceived as one operation indistinguishable for the perspective of the second user.

In operation S240, the gift information and the output layout may be displayed at predetermined positions on a screen of the second user terminal 30 according to the type of content information. In operation S250, the content information is output through the output layout.

For example, when a gift card is associated with photo-type content information, a photo may be output through a photo output layout in a preset first area, and an area under the first area is designated as a second area to output the gift information. However, for example, when the gift card is associated with content information of two types, that is, a photo type and a voice type, a third area may be provided between the first area and the second area and a voice may be output through an audio output layout in the third area. A form in which content information is displayed in the second user terminal 30 according to a type of the content information and the number of items of the content information may be preset for each type.

In operation S260, the second user terminal 30 receives an interaction for saving the output content information as an image. On the screen of the second user terminal 30 displayed in operation S250, an interface for requesting to store the output content information as an image may be displayed. The second user terminal 30 may receive an interaction to the interface.

In operation S270, the second user terminal 30 stores the output content information as an image. In some cases, when the output content information is not a photo or an image but a video, the content information may be stored with the video inserted therein.

According to the method for providing gift information by the server 10 described above with reference to FIG. 2 and the method for displaying gift information by the second user terminal 30 described above with reference to FIG. 3, when a sender (the first user) sends a gift card using content information provided or selected by the sender, a message may be displayed in a second user terminal according to a type of the content information and the content information may be appropriately output through an output layout. In doing so, it is possible for the second user to easily figure out the contents of the gift card sent by the sender.

Figure 4:
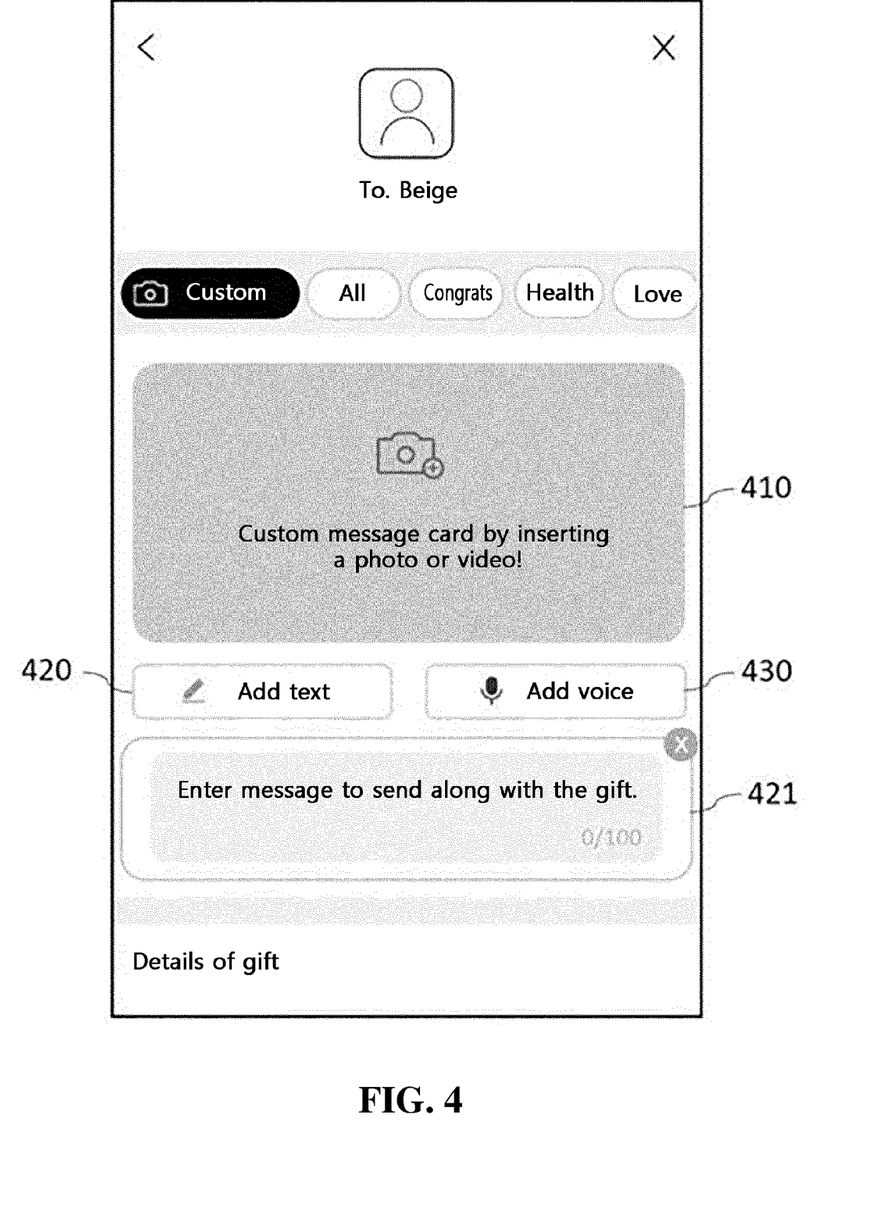
FIGS. 4 to 5 illustrate examples of a screen displayed on a user terminal during a process of providing a gift card according to an embodiment of the present disclosure.
Figure 5:
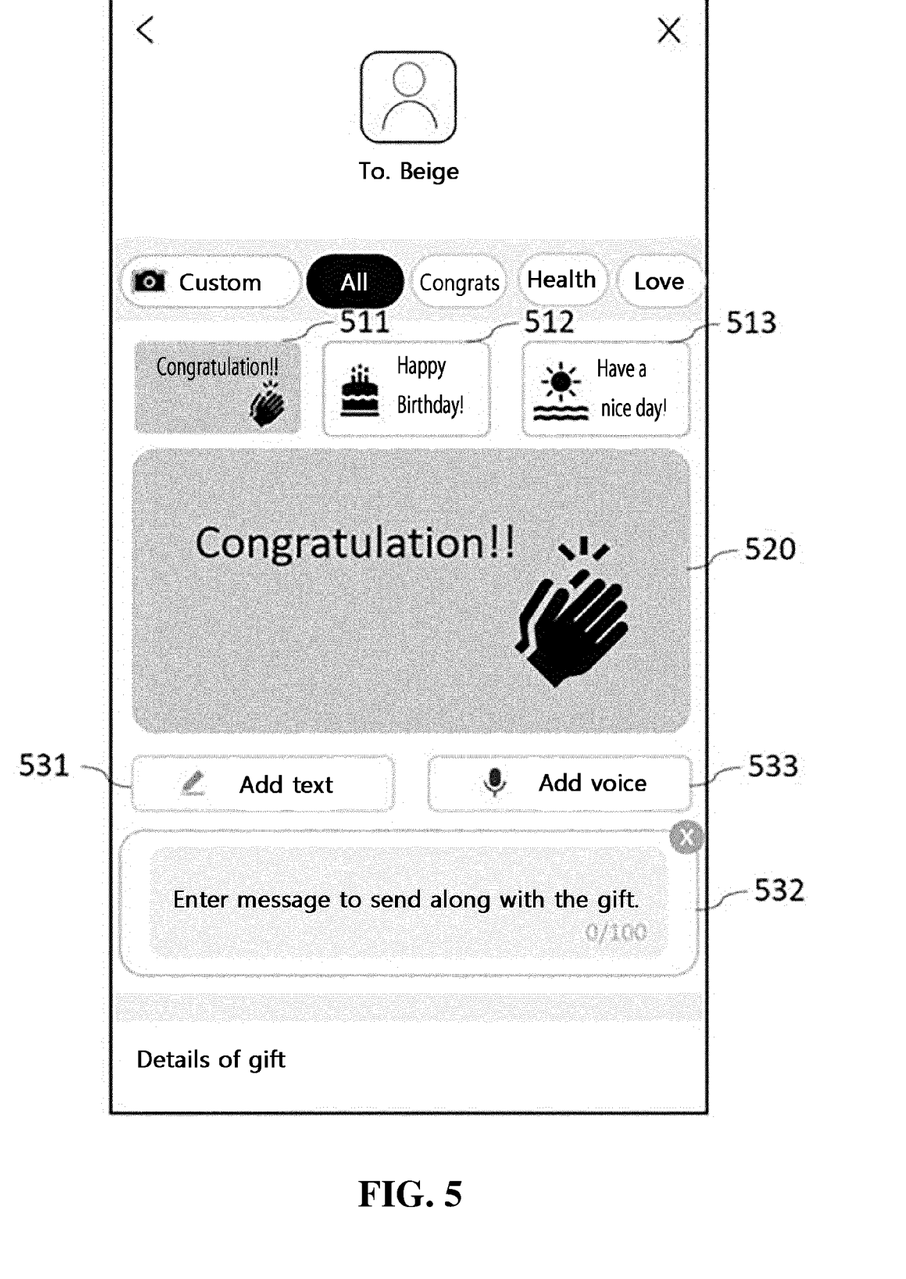

FIGS. 4 and 5 show exemplary screens of a first user terminal 20 when a server 10 performs a method for providing a gift card according to an embodiment of the present disclosure. FIGS. 4 and 5 may each be a screen of the first user terminal 20 when operation S110 is performed.

Referring to FIG. 4, the first user terminal 20 may provide gift card-associated information to the server 10 as content information. Through an interface as shown in FIG. 4, the first user terminal 20 may transmit at least one of an image including a photo stored in or newly created by the first user terminal 20, a video, an audio, and a text to the server 10 as content information.

Specifically, as shown in FIG. 4, an interface 410 for providing a photo or image, an interface 420 and 421 for providing text information, an interface 430 for providing voice information, and the like may be provided.

Referring to FIG. 5, the first user terminal 20 may select one of information stored in the server 10 as a part of content information associated with a gift card. Through an interface as shown in FIG. 5, the server 10 may provide stored information 511, 512, and 513 to the first user terminal 20, and the first user terminal 20 may select at least one 520 of the stored information.

In some cases, a method for the first user terminal 20 to select content information may vary depending on a type of the content information. Specifically, for a certain type of content information, a method in which the first user terminal 20 selects one of information stored in the server 10 may be applied. However, for other types of content information, a method for selecting information stored in the first user terminal 20 and providing the selected information as content information to the server 10 may be applied.

Referring to FIG. 5, content information of a card image type is displayed so as to select one of information stored in the server 10, whereas interfaces 531, 532, and 533 may be provided so that the first user terminal 20 can provide content information of a text type or voice type directly to the server 10. In addition, as shown in FIG. 4, an interface 410 may be provided so that the first user terminal 20 can provide an image (including an image captured by a user terminal and an image downloaded through a network) and information of a video type directly to the server 10.

Figure 6:
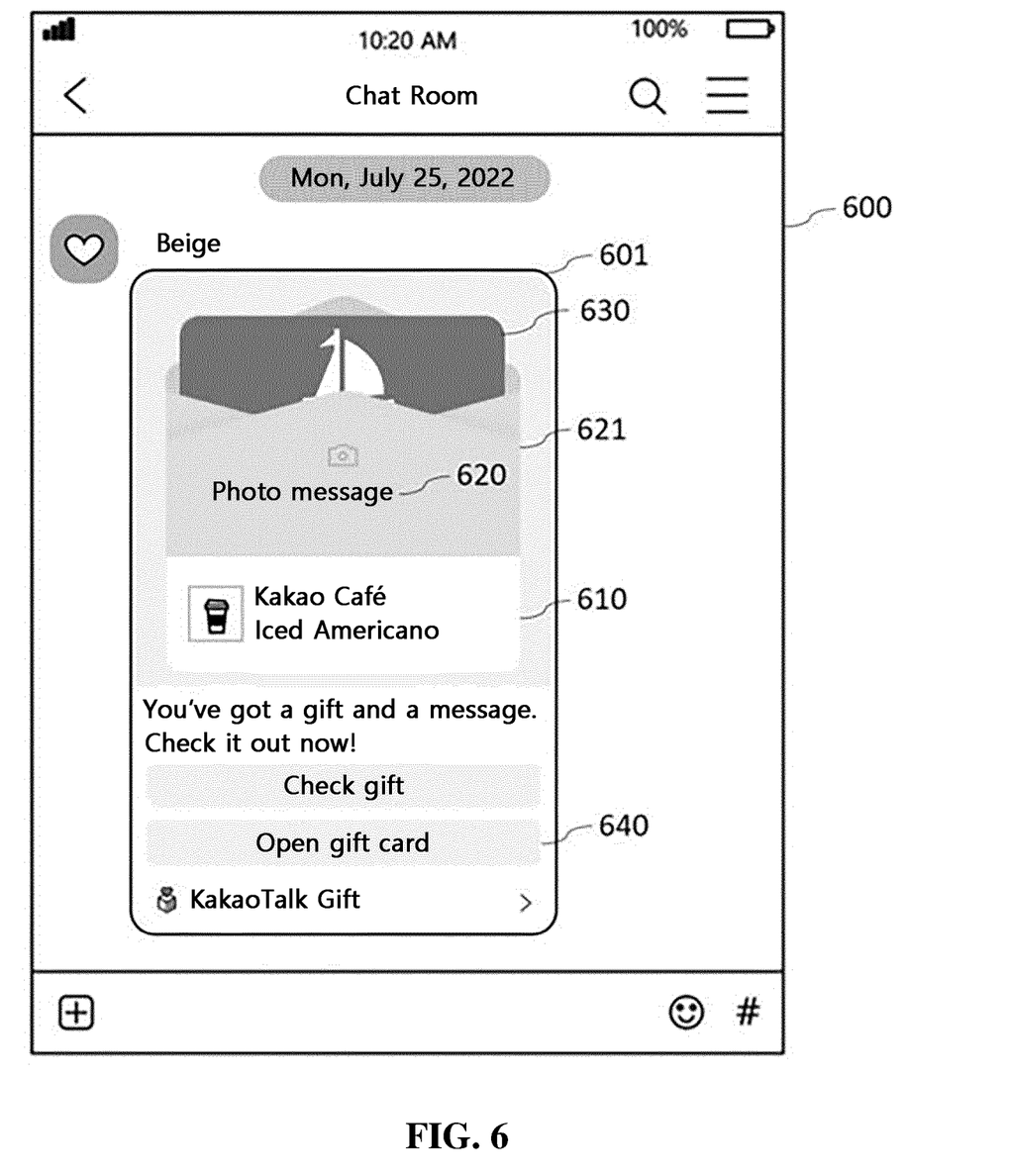
FIGS. 6 to 10 illustrate examples of a screen displayed on a user terminal during a process of performing a method for displaying a gift card according to an embodiment of the present disclosure.
Figure 7:
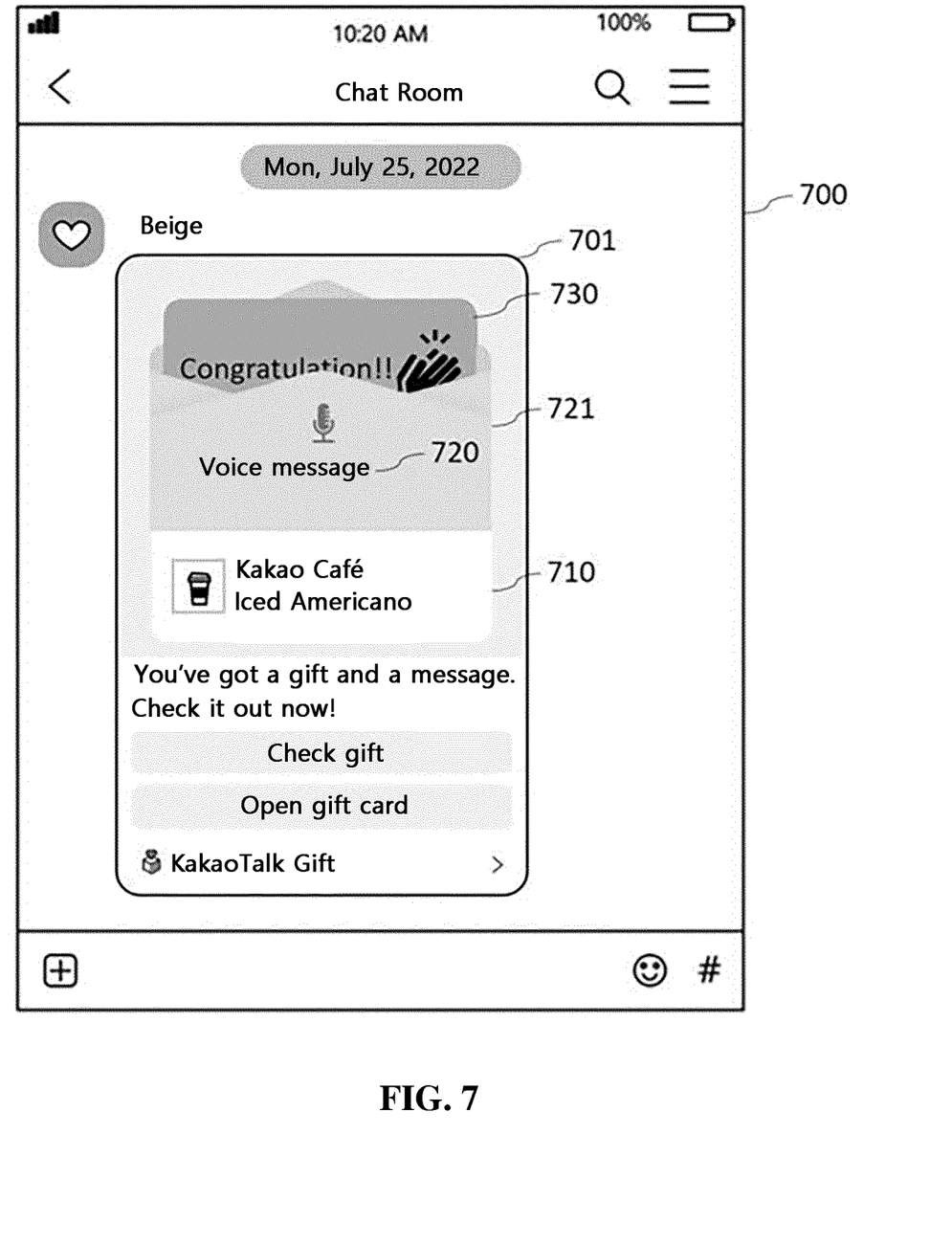
Figure 8:
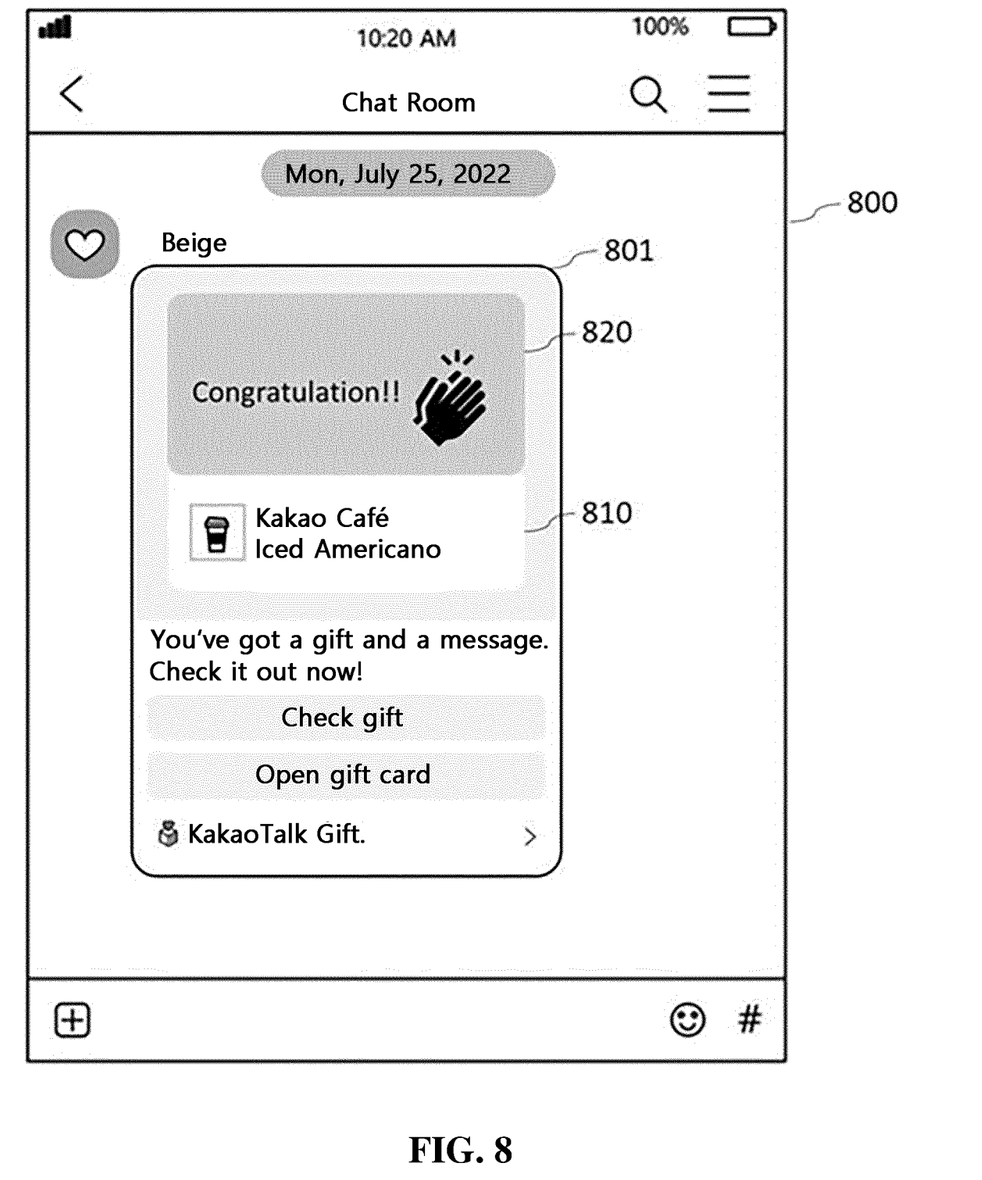

FIGS. 6 to 8 illustrate exemplary screens when a second user terminal 30 performs a method for displaying a gift card according to an embodiment of the present disclosure. FIGS. 6 to 8 may be screens of a first user terminal 20 when operation S220 is performed.

Referring to FIG. 6, a second user terminal 30 displays a message 601 in which gift information and a type of content information are displayed in a chat room 600. The gift information is displayed in a first area 610 of the message 601, the type of content information is displayed in a second area 620 of the message 601, and at least a part of the content information is displayed in a third area 630 of the message 601. That is, a gift card may be displayed through the first and second areas 610 and 620, and the gift information may be displayed through the third area 630.

The second area 620 may be displayed as a graphical user interface (GUI) through which a user's interaction can be received. The third area 630 corresponds to a location associated with the second area 620, and at least a part of the content information may be displayed in the third area 630. In the example of FIG. 6, the content information includes a photo, and a part of the photo is displayed in the third area 630. The second area 620 may be displayed as an envelope 621, and the third area 630 may be as a photo inserted in the envelope 621. The photo in the third area 630 may be displayed to be partially hidden by the envelope 621 in the second area 620.

A method for displaying in the second area 620 and the third area 630 of the message 601 may vary depending on characteristics of the chat room 600 in which the message 601 is displayed. For example, as shown in FIG. 6, when the chat room 600 is a one-to-one chat room, an envelope corresponding to the second area 620 may be open and a part of the content information corresponding to the third area 630 may be exposed and displayed. However, although not shown in the drawings, if the chat room 600 is an open chat room ("open chat" is a registered trademark of Kakao Corporation) which is accessible through a chat room link, the envelope corresponding to the second area 620 may be closed and the third area 630 may not be displayed separately.

Referring to FIG. 6, the second area 620 or an "Open Gift Card" button 640 may be displayed as an interface for requesting to view content information. The second user terminal 30 may receive an interaction of selecting the second area 620 or button 640.

Referring to FIG. 7, the second user terminal 30 displays a message 701 in which gift information and a type of content information are displayed in a chat room 700. Gift information may be displayed in a first area 710 of the message 701, a type of content information may be displayed in a second area 720 of the message 701, and at least a part of the content information may be displayed in a third area 730 of the message 701.

The exemplary screen of FIG. 7 will be described mainly about differences from the FIG. 6. The exemplary screen of FIG. 7 shows a case in which a gift card is associated with two different types of content information. Specifically, in the exemplary screen of FIG. 7, a gift card may be linked to both photo-type content information and audio-type content information.

As such, when the gift card is linked to both of the photo type content information and the audio type content information, a predetermined one of the photo type and audio type may be displayed in the message 701. For example, when both of the photo type content information and the voice type content information are linked to the gift card, the photo type content information may be displayed preferentially.

However, in some cases, a method for displaying a type of content information may be chanted by additionally considering nature of the content information. Specifically, the method for displaying content information may vary according to whether the content information is provided to the server 10 by the first user terminal 20 or whether the content information is information selected by the first user terminal 20 from among information stored in the server 10.

In the exemplary screen of FIG. 7, the photo-type content information may be information selected by the first user terminal 20 from information stored in the server 10, and the audio-type content information may be information provided by the first user terminal 20 to the server 10. In this case, the type of the content information provided to the server 10 by the first user terminal 20 may be displayed preferentially. Thus, as shown in FIG. 7, it can be seen that the type "voice message" is displayed in the second area 720 of the message 701. The photo in the third area 730 may be displayed to be partially hidden by the envelope 721 in the second area 720.

Referring to FIG. 8, the second user terminal 30 displays a message 801 in which gift information and a type of content information are displayed in a chat room 800. It can be seen that the gift information is displayed in a first area 810 of the message 801, and the content information is displayed in a second area 820 of the message 801.

The exemplary screen of FIG. 8 will be described mainly about differences from FIG. 6. The exemplary screen of FIG. 8 shows a case where there is no information provided to the server 10 by the first user terminal 20 in content information linked to a gift card. In FIG. 8, since there is no information provided to the server 10 by the first user terminal 20 in the content information linked to the gift card, the message 801 may be displayed in a different form from FIGS. 6 and 7. Specifically, the type of the content information may not be displayed in the message 801, and the content information may be displayed in the second area 820 in a manner that is not inserted in a displayed envelope.

Figure 9:
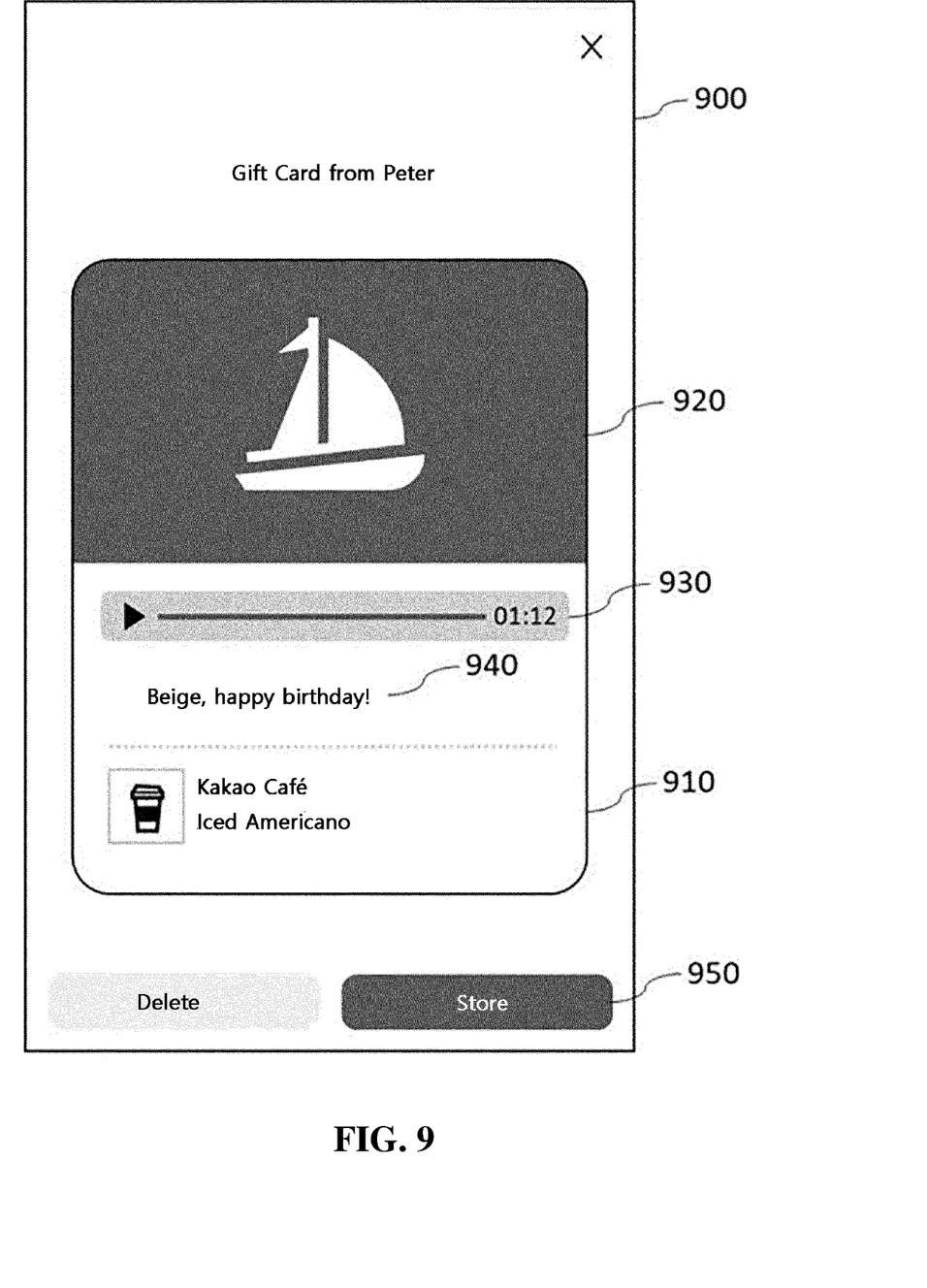
Figure 10:
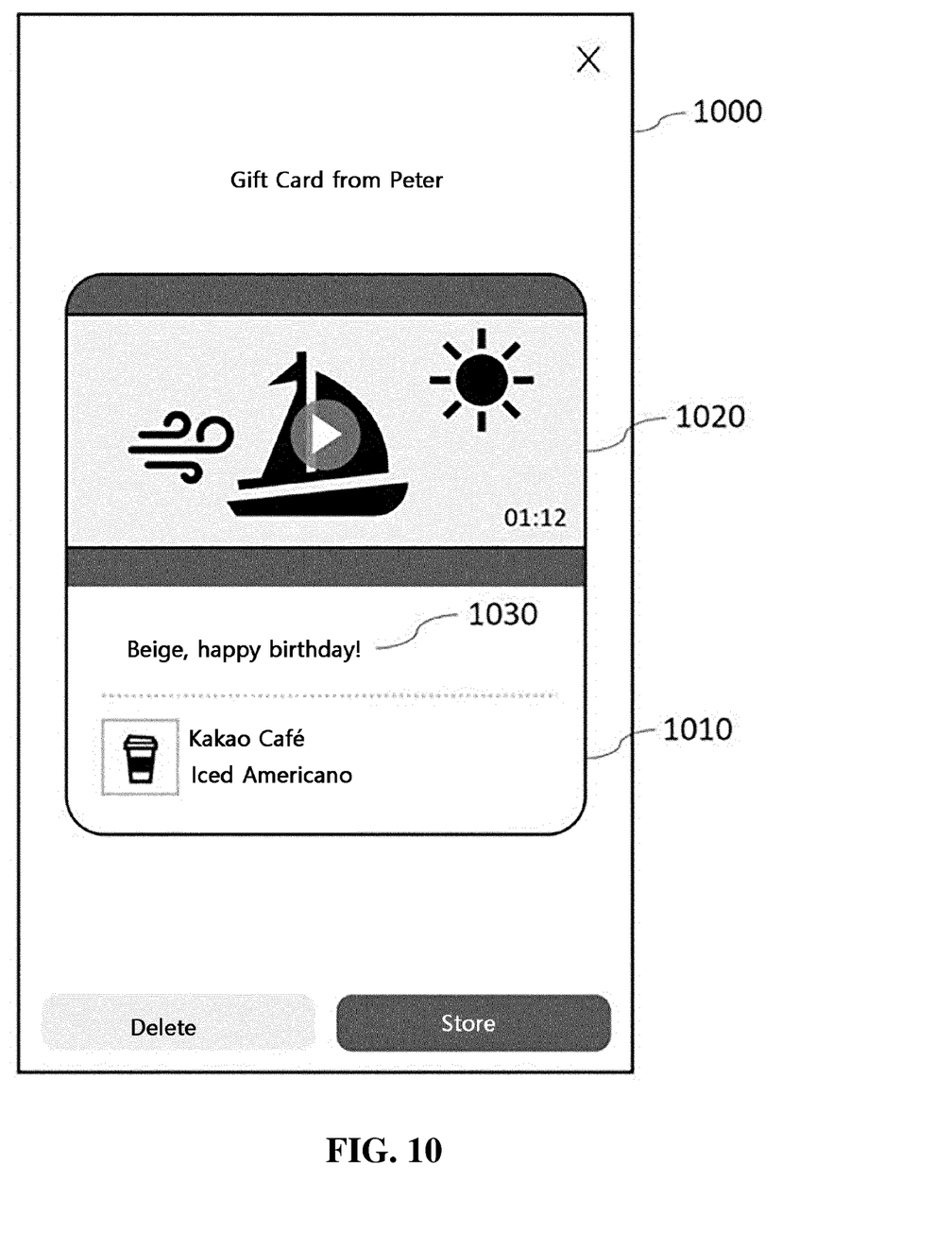

FIGS. 9 and 10 illustrate exemplary screens when a second user terminal 30 performs a method for displaying a gift card according to an embodiment of the present disclosure. FIGS. 9 and 10 may be screens of a first user terminal 20 when operations S240 and S250 are performed.

Referring to FIG. 9, the second user terminal 30 may display gift information 910 and content information in a separate window 900 upon a view request from a second user.

Referring to FIG. 9, the second user terminal 30 displays gift information 910 and output layouts 920, 930, and 940 according to a type of the content information. Specifically, in FIG. 9, the gift card is associated with photo-type content information, audio-type content information, and text-type content information. Thus, a photo output layout 920, a voice reproduction layout 930, and a text display layout 940 may be displayed. A photo may be output through the photo output layout 920, a voice may be reproduced through the voice reproduction layout 930, and the text may be displayed through the text display layout 940.

Positions of the layouts 920, 930, and 940 in the gift card display window 900 may be preset in advance. As shown in FIG. 9, the photo output layout 920 may be displayed uppermost, the voice reproduction layout 930 may be displayed under the photo output layout 920, the text display layout 940 may be displayed under the voice reproduction layout 930, and the gift information 910 may be displayed lowermost.

Referring to FIG. 9, an interface 950 for requesting to store output content information as an image may be displayed. The image to be stored may be in any of various forms. For example, photo information output through the photo output layout 920 may be stored as an image. In some cases, the window 900 displaying a gift card may be stored as one image.

The second user terminal 30 may receive an interaction to the interface 950. In response to the interaction to the interface 950, the second user terminal 30 may store the output content information as an image.

Referring to FIG. 10, the second user terminal 30 may display gift information 1010 and content information on a separate window 1000 according to a view request from the second user.

The exemplary screen of FIG. 10 will be described mainly on differences from FIG. 9. Referring to FIG. 10, the second user terminal 30 displays gift information 1010 and output layouts 1020 and 1030 according to a type of content information. Specifically, in FIG. 10, a gift card is associated with video-type content information and text-type content information. Thus, a video output layout 1020 and a text display layout 1030 may be displayed. Also, a video may be output through the video output layout 1020 and a text may be displayed through the text display layout 1030.

Positions of the layouts 1020 and 1030 in the window 1000 where the gift card is displayed may be preset in advance. Specifically, the type of the content information in FIG. 10 is different from that in FIG. 9, and thus, the layouts may be displayed in different arrangement than in FIG. 9.

Referring to FIG. 10, an interface 1050 for requesting to store output content information may be displayed. In FIG. 10, video information output through the video output layout 1020 may be stored. In some cases, the window 1000 where the gift card is displayed may be stored as one image.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and accompanying drawings, and various modifications and changes can be made by those skilled in the art. Accordingly, one of ordinary skill would understand that the scope of the present disclosure is not to be limited by the explicitly described above embodiments but by the following claims and equivalents thereof.

What is claimed is:

1. A method for electronic communications among a first user terminal, a server, and a second user terminal in a network by using a graphical user interface (GUI) message to transmit content information, wherein the content information is pre-stored in the server or directly provided from the first user terminal, the method comprising:

displaying a first interface on a display screen of the first user terminal for generating and transmitting the GUI message, wherein the first interface includes a photo and video interface for inserting a photo or a video, a text interface for inputting a text message, and a voice interface for inputting a voice message;

receiving, by the server, a user input through the first interface from the first user terminal, wherein the receiving of the user input includes:

displaying one or more of the content information pre-stored in the server and selecting one of the one or more of the content information; or receiving the content information directly provided from the first user terminal through the first interface, which is pre-stored in or newly created by the first user terminal;

transmitting and storing the selected one of the content information or the provided content information from the first user terminal to the server;

linking the selected and stored one of the content information or the provided and stored content information to the GUI message by creating a connection link;

attaching the connection link to the GUI message;

generating, by the server, the GUI message attached with the connection link based on the user input, wherein the GUI message includes:

a graphical image; and the content information including at least one of a photo type, a video type, a text type, or a voice type;

transmitting, by the server, the GUI message to the second user terminal in a format combining the graphical image and the content information in one transmission;

displaying, on a screen of the second user terminal, the GUI message in a chat room, wherein the GUI message comprises:

a first area configured to display the graphical image;

a second area configured to display a type of the content information; and a third area configured to display a preview of the content information, the third area being at least partially hidden by the second area, receiving, via a second interface of the second user terminal, a user interaction of selecting the second area or a content-opening interface for accessing the linked content information; and in response to the user interaction, displaying, on a separate window distinct from the chat room in the second user terminal, an output layout corresponding to the type of the content information, wherein the output layout comprises at least one of a photo viewer, a video player, a text viewer, or an audio player and is configured to display the linked content information through the connection link.

2. A method for displaying a graphical user interface (GUI) message linked to content information by a user terminal, the method comprising:

receiving, from a server, the GUI message generated based on a user input from another user terminal, the GUI message including:

a graphical image; and a connection link attached thereto for linking the GUI message to content information including at least one of a photo type, a video type, a text type, or a voice type;

displaying, on a screen of the user terminal, the GUI message in a chat room, wherein the GUI message includes:

a first area configured to display the graphical image;

a second area configured to display a type of the content information; and a third area configured to display a preview of the content information, the third area being at least partially hidden by the second area;

receiving, via a user interface of the user terminal, a user interaction of selecting the second area or a content-opening interface for accessing the linked content information; and in response to the user interaction, displaying, on a separate window distinct from the chat room, an output layout corresponding to the type of the content information, wherein the output layout comprises at least one of a photo viewer, a video player, a text viewer, or an audio player and is configured to display the linked content information through the connection link.

3. The method of claim 2, wherein in a case where the content information contains the video, at least a part of a still image at a specific point in time of the video contained in the content information is displayed in the third area.

4. The method of claim 2, wherein the graphical image includes a gift card image or an envelope image.

5. The method of claim 2, wherein in a case where the GUI message is displayed in the chat room, at least a part of the content information in the GUI message is displayed differently according to whether the content information is provided to the server by the first user terminal or whether the content information is information selected by the user terminal from among information stored in the server.

6. The method of claim 2, wherein in a case where the GUI message is associated with two different types of content information, one type selected by a predetermined method from among the two different types is displayed in the second area.

7. The method of claim 6, wherein the predetermined method is to select one of the two different types of content information according to the types of content information, wherein the types of content information are assigned priorities, and the type of content information with a higher priority is displayed in the second area.

8. The method of claim 2, wherein the output layout comprises two or more output layouts, and wherein in a case where the GUI message is associated with two different types of content information, two different output layouts of the two or more output layouts are displayed at predetermined positions according to the type of content information or the number of items of the content information.

9. The method of claim 2, wherein the output layout is the video player when the content information contains the video, and the output layout is the audio player when the content information contains the voice message.

10. The method of claim 2, further comprising:

receiving another interaction for storing the output content information as an image; and storing the output content information as the image in various forms, wherein the various forms include the content information displayed in the output layout or a window displaying the GUI message.

11. The method of claim 2, wherein in a case where the content information contains a photo, at least a part of the photo contained in the content information is displayed in the third area.

12. A non-transitory computer-readable medium with a computer program stored therein to execute, in conjunction with hardware, the method of claim 2.

13. A user terminal for displaying a graphical user interface (GUI) message linked to content information, the user terminal comprising:

a memory; and a processor connected to the memory and configured to execute instructions stored in the memory, wherein the processor is further configured to:

receive from a server, the GUI message generated based on a user input from another user terminal, the GUI message including:

a graphical image; and a connection link attached thereto for linking the GUI message to the content information including at least one of a photo type, a video type, a text type, or a voice type;

display, on a screen of the user terminal, the GUI message in a chat room, wherein the GUI message includes:

a first area configured to display the graphical image;

a second area configured to display a type of the content information; and a third area configured to display a preview of the content information, the third area being at least partially hidden by the second area;

receive, via a user interface of the user terminal, a user interaction of selecting the second area or a content-opening interface for accessing the linked content information; and in response to the user interaction, display, on a separate window distinct from the chat room, an output layout corresponding to the type of the content information, wherein the output layout comprises at least one of a photo viewer, a video player, a text viewer, or an audio player and is configured to display the linked content information through the connection link.

* * * * *